(12) United States Patent
Thomas et al.

(10) Patent No.: US 12,272,266 B2
(45) Date of Patent: *Apr. 8, 2025

(54) METHOD AND APPARATUS FOR PRESENTING EDUCATIONAL CONTENT TO INDIVIDUAL USERS

(71) Applicant: Speed of You Inc., San Diego, CA (US)

(72) Inventors: Ralph Thomas, Las Vegas, NV (US); Brian Rosenberg, Las Vegas, NV (US)

(73) Assignee: Speed of You Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,548

(22) Filed: Mar. 20, 2024

(65) Prior Publication Data
US 2025/0014473 A1 Jan. 9, 2025

Related U.S. Application Data

(63) Continuation of application No. 16/014,776, filed on Jun. 21, 2018, now Pat. No. 11,948,474.

(60) Provisional application No. 62/525,108, filed on Jun. 26, 2017.

(51) Int. Cl.
*G09B 7/04* (2006.01)
*G06F 17/18* (2006.01)
*G06F 18/23213* (2023.01)
*G09B 5/02* (2006.01)

(52) U.S. Cl.
CPC ............... *G09B 7/04* (2013.01); *G06F 17/18* (2013.01); *G06F 18/23213* (2023.01); *G09B 5/02* (2013.01)

(58) Field of Classification Search
None
See application file for complete search history.

(56) References Cited

U.S. PATENT DOCUMENTS 9,305,059 B1 4/2016 Glickman et al.

*Primary Examiner* — James B Hull
(74) *Attorney, Agent, or Firm* — Merchant & Gould P.C.

(57) ABSTRACT

A system includes a display device, one or more processors, and one or more computer-readable storage media communicably connected to the one or more processors and having instructions stored thereon that cause the one or more processors to: display a question on the display device, the question corresponding to a first category from among a plurality of categories; receive an input in response to the question from an input device associated with the display device; analyze the input to determine a quantifiable outcome based on the input; calculate a probabilistic value for the first category based on the quantifiable outcome; select a subsequent question based on the probabilistic value; and display the subsequent question on the display device.

18 Claims, 5 Drawing Sheets

METHOD AND APPARATUS FOR PRESENTING EDUCATIONAL CONTENT TO INDIVIDUAL USERS

CROSS-REFERENCE TO RELATED PATENT APPLICATIONS

This application is a continuation application of U.S. application Ser. No. 16/014,776, filed Jun. 21, 2018, which claims priority to, and the benefit of, U.S. Provisional Application No. 62/525,108, filed on Jun. 26, 2017, which are incorporated by reference herein in their entirety.

BACKGROUND

The present invention relates generally to the field of a teaching platform for presenting educational content to individual users. Generally, educational programs follow a fixed linear learning path for presenting educational content to individual user users (e.g., students). Typically, while each individual user absorbs educational content at his or her own pace, some educational programs generally require that each of the individual users follow the same linear learning path in order to advance through the educational content. Similarly, some educational programs present the same educational content in the same order to all individual users, regardless of the individual user's own pace for absorbing the educational content. Thus, a teaching platform that presents educational content corresponding to a non-linear learning path that is tailored to an individual user's abilities and pace for absorbing the educational content is desired.

The above information disclosed in this Background section is for enhancement of understanding of the background of the invention, and therefore, it may contain information that does not constitute prior art.

SUMMARY OF THE INVENTION

One implementation of the present disclosure is a system including a display device, one or more processors, and one or more computer-readable storage media communicatively connected to the one or more processors. The computer-readable storage media has instructions stored thereon that, when executed by the one or more processors, cause the one or more processors to: display a question on the display device, the question corresponding to a first category from among a plurality of categories; receive an input in response to the question from an input device associated with the display device; analyze the input to determine a quantifiable outcome based on the input; calculate a probabilistic value for the first category based on the quantifiable outcome; select a subsequent question based on the probabilistic value; and display the subsequent question on the display device.

In some embodiments, the quantifiable outcome may include a number of questions asked and accuracy of answers received.

In some embodiments, the probabilistic value may correspond to a category weight of the first category.

In some embodiments, the instructions may further cause the one or more processors to: calculate a first category weight for the first category based on the quantifiable outcome; calculate a second category weight for a second category from among the plurality of categories based on the quantifiable outcome; and select the subsequent question from among the first and second categories based on the first and second category weights.

In some embodiments, the instructions may further cause the one or more processors to: adjust a pre-requisite flag for the first category based on the quantifiable outcome; unlock a third category linked to the first category based on the pre-requisite flag for the first category; calculate a third category weight for the third category based on the quantifiable outcome; and select the subsequent question from among the first, second, and third categories based on the first, second, and third category weights.

In some embodiments, the instructions may further cause the one or more processors to: calculate a status of a user of the user device based on the quantifiable outcome; determine a pace for presenting questions from new categories from among the plurality of categories based on the status; and unlock at least one of the new categories based on the pace.

In some embodiments, each of the plurality of categories may be mastered, unlocked, or locked based on the pace and the quantifiable outcome.

In some embodiments, the instructions may further cause the one or more processors to: receive a first parameter value for controlling when the new categories are unlocked; and adjust the pace based on the first parameter value.

In some embodiments, the instructions may further cause the one or more processors to: receive a second parameter value for controlling when categories are mastered; and adjust the pace based on the second parameter value.

In some embodiments, the instructions may further cause the one or more processors to: receive a third parameter value for controlling when questions are selected from harder categories; and adjust the pace based on the third parameter value.

Another implementation of the present disclosure is a method including: displaying, by one or more processors, a question on a display device coupled to the one or more processors, the question corresponding to a first category from among a plurality of categories; receiving, by the one or more processors, an input in response to the question from an input device coupled to the display device; analyzing, by the one or more processors, the input to determine a quantifiable outcome based on the input; calculating, by the one or more processors, a probabilistic value for the first category based on the quantifiable outcome; selecting, by the one or more processors, a subsequent question based on the probabilistic value; and displaying, by the one or more processors, the subsequent question on the display device.

In some embodiments, the quantifiable outcome may include a number of questions asked and accuracy of answers received.

In some embodiments, the probabilistic value may correspond to a category weight of the first category.

In some embodiments, the method may further include: calculating, by the one or more processors, a first category weight for the first category based on the quantifiable outcome; calculating, by the one or more processors, a second category weight for a second category from among the plurality of categories based on the quantifiable outcome; and selecting, by the one or more processors, the subsequent question from among the first and second categories based on the first and second category weights.

In some embodiments, the method may further include: adjusting, by the one or more processors, a pre-requisite flag for the first category based on the quantifiable outcome; unlocking, by the one or more processors, a third category linked to the first category based on the pre-requisite flag for the first category; calculating, by the one or more processors, a third category weight for the third category based on the quantifiable outcome; and selecting, by the one or more processors, the subsequent question from among the first, second, and third categories based on the first, second, and third category weights.

In some embodiments, the method may further include: calculating, by the one or more processors, a status of a user of the user device based on the quantifiable outcome; determining, by the one or more processors, a pace for presenting questions from new categories from among the plurality of categories based on the status; and unlocking, by the one or more processors, at least one of the new categories based on the pace.

In some embodiments, each of the plurality of categories may be mastered, unlocked, or locked based on the pace and the quantifiable outcome.

In some embodiments, the method may further include: receiving, by the one or more processors, a first parameter value for controlling when the new categories are unlocked; and adjusting, by the one or more processors, the pace based on the first parameter value.

In some embodiments, the method may further include: receiving, by the one or more processors, a second parameter value for controlling when categories are mastered; and adjusting, by the one or more processors, the pace based on the second parameter value.

In some embodiments, the method may further include: receiving, by the one or more processors, a third parameter value for controlling when questions are selected from harder categories; and adjusting, by the one or more processors, the pace based on the third parameter value.

BRIEF DESCRIPTION OF THE DRAWINGS

The above and other aspects and features of the present disclosure will become more apparent to those skilled in the art from the following detailed description of the example embodiments with reference to the accompanying drawings, in which.

DETAILED DESCRIPTION

Figure 1:
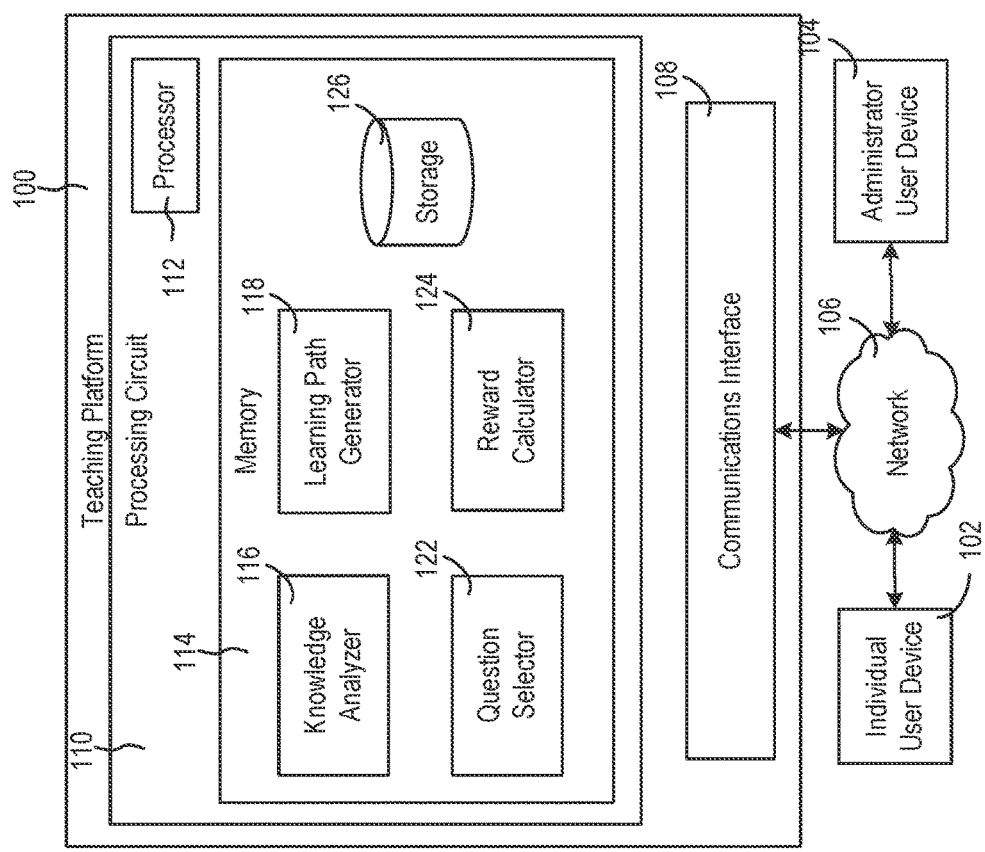
FIG. 1 is a block diagram of a teaching platform, according to an exemplary embodiment.

Hereinafter, example embodiments will be described in more detail with reference to the accompanying drawings. While the present invention is described hereinafter in terms of a teaching platform, the present disclosure is not limited thereto, and instead, should be understood as an example for embodying the spirit and scope of the present invention as applied to an educational context. For example, in various other embodiments, aspects and features of the present disclosure can be applied to any suitable platform that presents content to individual users, such as video games or other interactive games, social media, fitness trackers and other health care content providers, and/or the like. Accordingly, hereinafter, the present invention will be described in more detail in terms of a teaching platform as a non-limiting example embodiment.

Overview

According to various embodiments, a teaching platform is provided that assesses the knowledge base or skills of an individual user to customize a non-linear learning path for presenting educational content that is tailored to the individual user's abilities. In some embodiments, the teaching platform automatically adjusts the non-linear learning path as the individual user interacts with the educational content. For example, in some embodiments, the teaching platform presents questions from one or more categories to the individual user, and the individual user inputs answers to the questions. In this case, the teaching platform selects one or more subsequent questions to present to the individual user based on an assessment of one or more answers input to the questions. In some embodiments, the teaching platform utilizes various data science methods, such as Test and Control or K-Means Clustering, for example, to continuously adjust (or improve) the learning path generation algorithm as various individual users interact with the teaching platform.

In some embodiments, the teaching platform assesses changes in an individual user's mood or behavior to dynamically adjust the learning path for presenting educational content to the individual user. In some embodiments, teaching platform determines the changes in mood or behavior based on the individual user's interaction with the educational content. For example, in some embodiments, teaching platform compares a current performance indicator with historical performance data associated with the individual user to determine whether the individual user's focus on the educational content appears to be normal or abnormal. In this case, the teaching platform automatically adjusts the learning path for the individual user if the individual user's focus appears to be abnormal.

In some embodiments, the teaching platform provides incentives to increase a level of engagement with the educational content. For example, in some embodiments, the teaching platform incorporates educational content into games, movies, videos, and/or the like. In this case, the individual user interacts with the educational content in order to advance in the games, movies, videos, and/or the like. In other example embodiments, the teaching platform provides points, tokens, tickets, trophies, level-ups, achievements, and/or the like based on the individual user's performance. In this case, the points, tokens, trophies, level-ups, achievements, and/or the like can be exchanged or otherwise used to unlock additional content, for example, such as avatars, quests, stickers, collectable cards, characters, additional time, additional content (e.g., games, movies, videos, etc.), and/or the like. In some embodiments, the points, tokens, trophies, level-ups, achievements, and/or the like can be exchanged or otherwise used to unlock content that is free of interruptions.

In some embodiments, teaching platform generates reports based on the individual user's progress and performance on the educational content, and provides the reports to an administrator user (e.g., a parent, guardian, supervisor, manager, teacher, mentor, and/or the like) via an administrator user device. For example, in some embodiments, the reports identify areas or subject matter that the individual user is struggling with and/or excelling in, and the administrator user can view the reports to engage the individual user, modify the learning path, modify the pace, assign educational content, and/or the like. For example, in some embodiments, the administrator user can override the learning path to require more practice with educational content in a particular area or subject matter. In some embodiments, the administrator user can create assignments in a particular area or subject matter, and the teaching platform provides educational content corresponding to the assignments. In some embodiments, the administrator user can change a pace or level of difficulty of the learning path for the individual user based on the report. Several features of teaching platform are described in more detail below.

Teaching Platform

FIG. 1 is a block diagram of a teaching platform and system, according to various embodiments. The teaching platform 100 may be configured to present educational content to an individual user, through a customized non-linear learning path. In various embodiments described herein, the teaching platform 100 displays the educational content on a display device associated with an individual user device 102, and receives input from the individual user via the individual user device 102. In some embodiments, the teaching platform generates reports corresponding to the individual user's performance in one or more areas or subject matters (e.g., subjects or topics), and displays the reports (e.g., via a graphical user interface or dashboard) on a display device associated with an administrator user device 104.

In some embodiments, the teaching platform 100 analyzes the user input (e.g., answers to questions) to determine the individual user's knowledge base or skills in one or more categories. In certain embodiments, teaching platform 100 generates a customized non-linear learning path that is tailored to the individual user's knowledge base or skills. For example, the teaching platform 100 may dynamically adjust the learning path based on the individual user's performance in the one or more categories. In various embodiments, teaching platform 100 presents educational content to the individual user based on the customized learning path. In certain embodiments, the learning path includes a plurality of weighted categories, each of the categories having corresponding educational content. For example, the educational content for each of the categories may include a plurality of questions, and a question from a particular category is presented to the individual user to answer via the user device 102 based on the weight of the particular category.

For example, in some embodiments, the teaching platform 100 calculates a weight for each of the categories based on the individual user's answers to one or more questions, and the weights are used to determine from which categories to select one or more subsequent questions to present to the individual user. In this case, the teaching platform 100 determines when the individual user should be presented questions from new (or locked) categories, when the individual user should no longer be presented questions from old (or unlocked) categories, and when the individual user should be presented questions from easy or difficult categories, depending on the individual user's learning path and pace.

In various embodiments, the teaching platform 100 is implemented on one or more dedicated computers or servers. In other embodiments, the teaching platform 100 is implemented as one or more applications running on the individual user device 102, the administrator user device 104, or the one or more other computer devices connected to the network 106 (or any combination of those devices). In some embodiments, the various components of teaching platform 100 is integrated within a single device (e.g., a server) or distributed across multiple separate systems or devices. In other embodiments, some or all of the components of teaching platform 100 is implemented as part of a cloud-based computing system configured to exchange data with one or more individual user devices 102, administrator user devices 104, or other devices connected to the network 106. Each of the individual user device 102 and the administrator user device 104 may include any suitable computing device, for example, but not limited to a desktop computer, laptop, smart phone, tablet, gaming device, and/or the like. The input device may be any suitable user input device, for example, but not limited to a keyboard, mouse, touch-pad, touch-screen, joystick, controller, and/or the like.

Still referring to FIG. 1, in some embodiments, teaching platform 100 includes a communications interface 108. In some embodiments, communications interface 108 facilitates communications between teaching platform 100, individual user device 102, and administrator user device 104. In some embodiments, communications interface 108 includes a wired or wireless communications interface (e.g., jacks, antennas, transmitters, receivers, transceivers, wire terminals, etc.) for conducting data communications with user device 102 and administrator user device 104. In various embodiments, communications via communications interface 108 are direct (e.g., local wired or wireless communications) or via a network (e.g., a WAN, the Internet, a cellular network, etc.) 106. For example, in some embodiments, communications interface 108 includes an Ethernet card and port for sending and receiving data via an Ethernet-based communications link or network. In some embodiments, communications interface 108 includes a Wi-Fi transceiver for communicating via a wireless communications network. In some embodiments, communications interface 108 includes cellular or mobile phone communications transceivers.

In some embodiments, teaching platform 100 includes one or more processing circuits 110 including one or more processors 112 and memory 114. Each of the processors 112 can be a general purpose or specific purpose processor, an application specific integrated circuit (ASIC), one or more field programmable gate arrays (FPGAs), a group of processing components, or other suitable processing components. Each of the processors 112 is configured to execute computer code or instructions stored in memory or received from other computer readable media (e.g., CDROM, network storage, a remote server, etc.). Memory 114 includes one or more devices (e.g., memory units, memory devices, storage devices, etc.) for storing data and/or computer code for performing and/or facilitating the various processes described in the present disclosure. Memory 114 includes random access memory (RAM), read-only memory (ROM), hard drive storage, temporary storage, non-volatile memory, flash memory, optical memory, or any other suitable memory for storing software objects and/or computer instructions. Memory 114 includes database components, object code components, script components, or any other type of information structure for supporting the various activities and information structures described in the present disclosure. In some embodiments, memory 114 is communicably connected to the processors 112 via the processing circuits 110 and includes computer code for executing (e.g., by processor 112) one or more processes described herein. In embodiments in which the teaching platform is implemented on one or more of the individual user device 102, the administrator user device 104, or other computer devices connected to the network 106, the processor 112 and memory 114 may include a processor and memory of or associated with the individual user device 102, the administrator user device 104, or the other computer devices connected to the network 106.

In various embodiments, memory 114 includes a knowledge analyzer 116, a learning path generator 118, a question selector 122, a reward calculator 124, and storage 126. While storage 126 is shown in FIG. 1 as being part of the memory 114, the present disclosure is not limited thereto, and storage 126 can be internal storage or external storage. For example, in various embodiments, storage 126 is internal storage with relation to teaching platform 100, and/or includes a remote database, cloud-based data hosting, or other remote data storage.

In some embodiments, knowledge analyzer 116 analyzes the answers input to one or more questions presented to the user, and calculates a quantifiable outcome (X, Y) for each category corresponding to the questions. For example, knowledge analyzer 116 determines a number (or set) X of questions or user-activities presented from each category, and calculates an accuracy Y of the answers or responses input by the individual user. In some embodiments, the accuracy Y of the answers corresponds to a percentage or other value of correct answers (or proximity to a target answer or activity) input by the individual user in response to the number (or set) X of questions. In some embodiments, knowledge analyzer 116 can scale the outcome (X, Y) for a particular category by a linear factor (e.g., twenty question equivalency or TQE). For example, in some embodiments, knowledge analyzer 116 scales the set of questions presented X by the linear factor so that each question is given a weight corresponding to the linear factor. In this case, in a non-limiting example where the linear factor corresponds to a TQE, if the linear factor is equal to 5, each question in the set is treated as four questions, whereas if the linear factor is equal to 40, every two questions are treated as a single question.

In some embodiments, knowledge analyzer 116 assigns attributes that define the quantifiable outcome (X, Y) for a particular category. For example, in some embodiments, knowledge analyzer 116 can cap the number of questions X or accuracy of the answers Y that are considered, for example, such as setting a value for Last X or Last Y. For a non-limiting example, if the Last X value for a particular category is set as 20, then the accuracy of the answer Y is calculated based on only the answers input to the last 20 questions asked. In another example, knowledge analyzer 116 can define a number of questions X and/or a level of accuracy of the answer Y to initiate an action. For a non-limiting example, if a Mod X value is defined as 10, then for every $10^{th}$ question, an action can be initiated. Similarly, in another non-limiting example, if a Mod Y value is defined as 50%, then if the accuracy answers Y dip below or increase above 50%, and action can be initiated. In some embodiments, an action may include, but is not limited to, providing a hint, an instructional video, a message, a reward, or the like.

In some embodiments, knowledge analyzer 116 determines a status level (or current status level) of the individual user based on the quantifiable outcome (X, Y). For example, in some embodiments, the status level of the individual user can include struggling, excelling, practice, normal, and/or the like. Other examples may employ numerical status levels (e.g., level 1, level 2, etc.) or other status levels or labels, for example, ranging from a low level to one or more higher levels. In the above-noted example, if knowledge analyzer 116 determines that the individual user has recently answered many questions (e.g., a defined number of questions) incorrectly, then the status of the individual user is determined to be struggling (or status level 1). Similarly, if knowledge analyzer 116 determines that the individual user has recently answered many questions (e.g., a defined number of questions) correctly, then the status of the individual user is determined to be excelling (or status level X, where X is a number greater than 1). On the other hand, if knowledge analyzer 116 determines that the learning path of the individual user has been overridden (e.g., the questions and/or categories are manually selected by the individual user or administrator user), then the status of the individual user is determined to be practice (or status level Y, where Y is a predefined number). Further, if knowledge analyzer 116 determines that none of the other statuses apply, then the status of the individual user is determined to be normal (or status level N, where N is a number between 1 and X). As discussed in more detail below, in some embodiments, the status of the individual user is used to determine a pace for how quickly or slowly new educational content is presented to the individual user.

Figure 5:
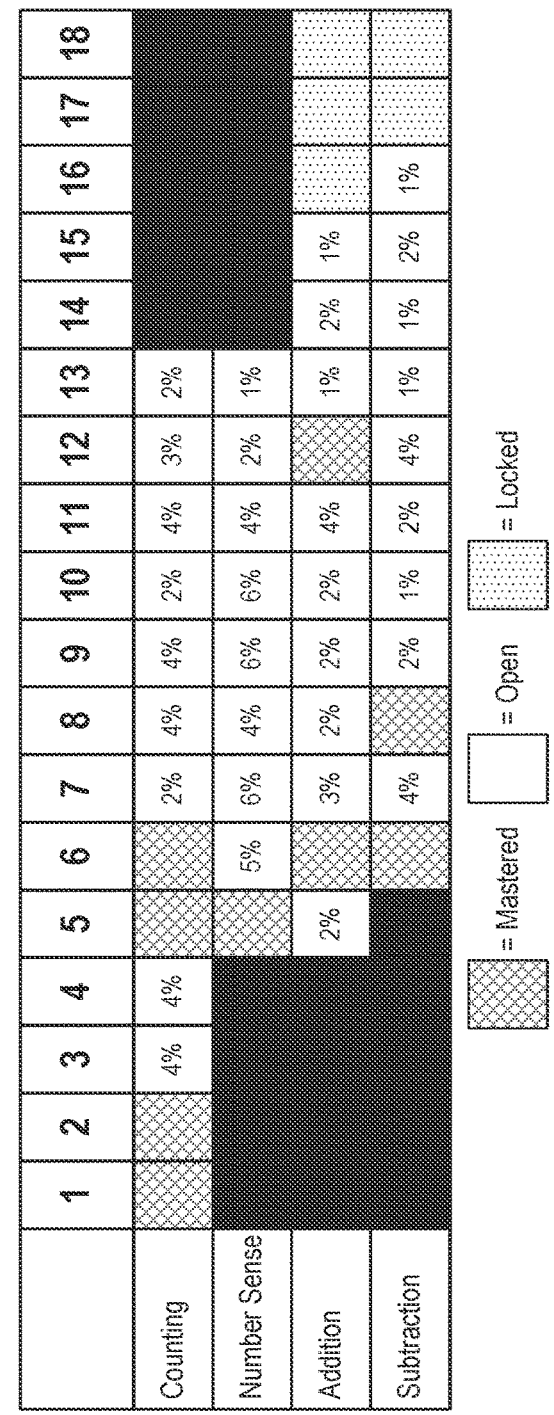
FIG. 5 is a graphical representation of a non-linear learning path with a custom pace, according to an exemplary embodiment.
Figure 7:
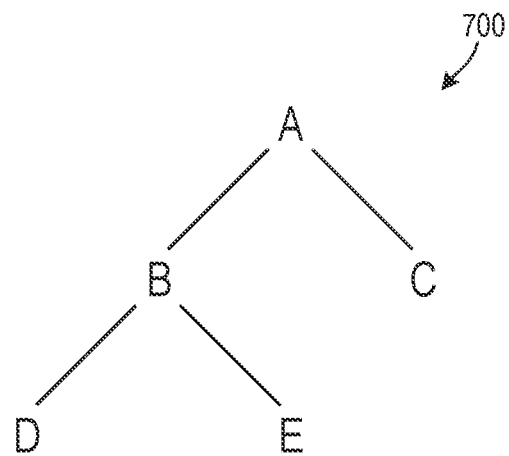
FIG. 7 is graphical representation of a web of prerequisite categories for a particular individual user, according to an exemplary embodiment.

Still referring to FIG. 1, in some embodiments, learning path generator 118 forms linkages between the categories from which the questions are provided, and determines a next category from which subsequent questions can be selected. For example, FIG. 7 shows a web of pre-requisite categories generated by the learning path generator 118 for a particular individual user. Referring to FIG. 5, the learning path generator 118 links various categories A, B, C, D, E to each other depending on the status and pace of the individual and the pre-requisite relationships between the categories.

For example, in some embodiments, each categories is a member of a web (or tree) 700 of category pre-requisites including one or more series of pre-requisite pairings (Category, PreReq Category). For each category A, B, C, D, E in the web 700, the set of pre-requisites may be defined by a chain of pre-requisite parings (Category, PreReq Category). For example, the pre-requisite paring (Category, PreReq Category) for category A may be defined as (1, 0), where 0 indicates that there are no PreReq Categories for this category. In another example, for each of categories B and C, only category A is a PreReq Category. Thus, the pre-requisite parings (Category, PreReq Category) for categories B and C may be defined as (2, 1) and (3, 1), respectively. In another example, for topics D and E, category B is a PreReq Category. Thus, the pre-requisite paring (Category, PreReq Category) for categories D and E may be defined as (4, 2) and (5, 2), respectively. In this case both categories A (e.g., 1) and B (e.g., 2) are PreReq Categories for each of D and E, since category A is a PreReq Category for category B as defined by category B's pre-requisite paring (e.g., (2, 1)). In some embodiments, not every category needs to be a member of the web 700, but a category may not be a member of a web that defines a PreReq Category for itself.

In some embodiments, learning path generator 118 dynamically generates the learning path for the individual user based on the quantifiable outcome (X, Y) for one or more categories to determine when questions can be selected from particular ones of the categories for presentation to the individual user. For example, in some embodiments, learning path generator 118 calculates a probabilistic value based on the quantifiable outcome (X, Y) for a particular category. The probabilistic value is the weight of a particular category that corresponds to a probability that a next question will be selected from the particular category. In some embodiments, the probabilistic value is calculated based on whether the quantifiable outcome (X, Y) for a particular individual user exceeds or is below one or more threshold values. For example, in some embodiments, a particular category can be open (or unlocked) or closed (or locked) depending on the probabilistic values of related linked categories for the particular user. In this case, learning path generator 118 determines when to open categories or when to close (or keep closed) categories, based on the probabilistic values. The Question Selector 122 (discussed below) can select questions from open categories, but cannot select questions from any closed categories.

In some embodiments, the learning path generator 118 assigns a particular individual to one or more of a plurality of probabilistic engines based on the status (or based on the pace) of the particular individual. In some embodiments, each of the probabilistic engines includes one or more cubes, and each of the cubes includes one or more layers. For example, in some embodiments, each of the layers includes a set of three-dimensional values (X, Y, Z) (e.g., a real-valued function with domain (X, Y, Z)). In this case (X, Y) corresponds to the quantifiable outcome (X, Y) calculated by the knowledge analyzer 116, and Z defines a layer type for the layer. In some embodiments, each of cubes includes one layer for each layer type. In some embodiments, the learning path generator 118 outputs a real numbered value for each cube (e.g., for each layer's quantifiable outcome (X, Y) and layer type Z) for a particular category.

For example, in some embodiments, a first layer type (e.g., layer type=1) defines a category weight for a particular category. In this case, depending on the quantifiable outcome (X, Y) (e.g., high performing individual user or low performing individual user) for a particular category, learning path generator 118 calculates a category weight for the particular category that is used to determine a probability that a subsequent question will be selected from the particular category to present to the individual user. In some embodiments, the probabilistic value generally corresponds to the category weight (e.g., layer type=1), but can also depend on the values of other layer types. For example, in some embodiments, a second layer type (e.g., layer type=2) defines a pre-requisite flag for a particular category. In this case, depending on the linkages for a particular category, learning path generator 118 assigns the pre-requisite flag (e.g., of 0 or 1) to determine if all the pre-requisites for the particular category has been satisfied. In some embodiments, if the pre-requisite flag indicates that the pre-requisite for a particular category has not been satisfied (e.g., PreReq flag=0), then the category weight is set to 0 and the category is closed or locked (or remains closed or locked). However, if the pre-requisite flag indicates that the pre-requisites for the particular category are satisfied (e.g., PreReq flag=1), then other categories that depend on (or are linked to) the particular category as a pre-requisite are made available (e.g., opened or unlocked) to present to the individual user (e.g., assuming that other pre-requisites are also satisfied, if any), while categories requiring further pre-requisites remain closed or locked. In some embodiments, the function output values for a given Z value, which determine the probabilistic value when applied to the appropriate layer types (e.g., category weight and PreReq flag) are determined by comparing the quantifiable outcome (X, Y) to minimum and maximum X values, minimum and maximum Y values, and any suitably modified values (e.g., Last X, Last Y, Mod X, Mod Y, and/or the like).

In still another example, in some embodiments, a third layer type (e.g., layer type=3) defines a refresher category to re-open or unlock one or more older categories that have been closed or locked due to the individual user's demonstration that the area or subject matter of the one or more older categories are mastered. For example, in some embodiments, if the individual user appears to be struggling with a particular category (e.g., based on the quantifiable outcome (X, Y) of the particular category or status), learning path generator 118 determines one or more pre-requisite categories for the particular category. In this case, learning path generator 118 re-opens or unlocks one or more of the pre-requisite categories so that one or more questions can be selected therefrom to present to the individual user as a refresher.

In some embodiments, learning path generator 118 determines a pace for presenting new educational content to the individual user. The pace is used to determine how quickly (or slowly) educational content from new categories are presented to the individual user. For example, in some embodiments, learning path generator 118 adjusts the pace based on the status of the individual user as determined by knowledge analyzer 116 (discussed above). In this case, in some embodiments, the learning path generator 118 slows the pace (e.g., presents more questions from a particular category before being presented questions from new categories, presents questions from the particular category at a slower rate, provides more time to answer each question or plurality of questions from the particular category, or a combination thereof) if the status is determined to be struggling, increases the pace (e.g., presents less questions from a particular category before being presented questions from new categories, provides questions from the particular category at a faster rate, provides less time to answer each question or plurality of questions from the particular category, or a combination thereof) if the status is determined to be excelling, maintains the pace if the status is determined to be normal, and/or the like. In some embodiments, the user status is controlled by a layer type that applies to all categories, so that the pace can be adjusted or maintained for all categories.

In some embodiments, learning path generator 118 adjusts the pace based on one or more user defined parameters. In some embodiments, each of the parameters can be adjusted by a user (e.g., an individual user or administrator user), via the input device of the individual user device 102 or the administrator user device 104 (or other device connected to the network 106), through a slider, buttons, or other suitable selector displayed on a GUI (e.g., a scale of 1-10), or other suitable input mechanism. For example, in some embodiments, the user (e.g., the individual user or administrator user) can adjust a first parameter corresponding to when new categories are presented (e.g., opened or unlocked) to the individual user, a second parameter corresponding to when categories are no longer presented to the individual user (e.g., mastered categories), a third parameter corresponding to whether easier categories or harder categories are more likely to be selected, and/or the like. In this case, for example, if the user sets the first parameter to 1, then questions from a new category are presented (or opened) only after the individual user has shown that the pre-requisite categories are well understood (e.g., answers a higher number of questions in a row or more questions correctly, the individual user's quantifiable outcome exceeds a higher threshold such as 90%, or the like). On the other hand, if the user sets the first parameter to 10, then the questions from a new category are presented once the individual user has shown a basic understanding of the pre-requisite categories (e.g., answers a less number of questions in a row or less questions correctly, the individual user's quantifiable outcome exceeds a lower threshold such as 50%, or the like). In another example, if the user sets the second parameter to 1, then categories are considered to be "mastered" (and thus, are locked or no longer selected) only after the individual user has demonstrated a complete understanding of the category (e.g., answers a higher number of questions in a row or more questions correctly, the individual user's quantifiable outcome exceeds a higher threshold such as 90%, or the like). On the other hand, if the user sets the second parameter to 10, then categories are considered to be "mastered" after the individual user has demonstrated reasonable aptitude in the category (e.g., answers a less number of questions in a row or less questions correctly, the individual user's quantifiable outcome exceeds a lower threshold such as 50%, or the like). In another example, if the user sets the third parameter to 1, then easier categories are selected, whereas if the user sets the third parameter to 10, then harder categories are selected. In a non-limiting example, an easier category may include adding two single digit numbers, whereas a harder category may include adding 3 or more double digit numbers. However, the present disclosure is not limited thereto, and in other embodiments, any suitable parameters may be used to adjust the pace for presenting content to the individual user.

Referring to FIG. 1, question selector 122 selects questions from categories based on the learning path (or linkages) and pace (which can be based on status or can be user defined). In some embodiments, question selector 122 selects questions from available (e.g., open or unlocked) categories based on the probabilistic values corresponding to the categories. For example, question selector 122 selects questions from open categories based on the category weight of the category (e.g., first layer type). In some embodiments, categories are considered to be opened or unlocked if all of the pre-requisites (e.g., as determine by the second layer type) are satisfied and the categories have not yet been mastered. In this case, in some embodiments, the category weight for categories that are already mastered can be set to 0, while the category weight for categories that are open is calculated by the learning path generator 118 based on the quantifiable outcome (X, Y) for the categories as discussed above.

In a non-limiting example, in some embodiments, a first open category can have a category weight of 40 based on the quantifiable outcome (X, Y) for the first open category, and a second open category can have a category weight of 60 based on the quantifiable outcome (X, Y) for the second open category. In this case, there is a 40% chance that question selector 122 will pick a next question to present to the individual user from the first open category, and a 60% chance that question selector 122 will pick the next question to present from the second open category. For example, in some embodiments, question selector 122 includes a random number generator to generate a random number between 1 and 100 (or any suitable range), and in this non-limiting example, if question selector 122 generates a number between 1 and 40, a question is selected (e.g., randomly or based on difficulty or weightage of the question) from the first open category, whereas if a number between 41 and 100 is generated, a question is selected (e.g., randomly or based on difficulty or weightage of the question) from the second open category. However, the present disclosure is not limited thereto, and in other embodiments, question selector 122 selects questions from the open categories based on the category weights via any suitable method.

In some embodiments, question selector 122 selects a plurality of questions based on the category weights of the open categories to generate a queue of questions for the individual user. In this case, the questions are presented to the individual user from the queue of questions as needed or desired (for example, upon completion of one or more previous questions or upon a defined time period or event). For example, the question selector 122 may select one or more questions periodically (e.g., once every minute or other defined time period) to add to the queue of questions. In some embodiments, question selector 122 determines a number of questions to fill the queue of questions at any given time based on one or more performance indicators of the individual user. For example, question selector 122 calculates an average time for the individual user to answer a question based on historical data, and determines the number of questions that should fill the queue of questions to enhance or maximize performance. In some embodiments, the question selector 122 determines a threshold or minimum number of questions that are allowed to be in the queue of questions before more questions should be added to the queue of questions. In some embodiments, question selector 122 determines whether the questions in the queue of questions correspond to the current open categories for the individual user. In this case, the questions that do not correspond to the current open categories may be removed from the queue of questions or stored for later use as the open categories change over time.

In some embodiments, a user (e.g., the individual user or administrator user) can specify the categories from which the question selector 122 selects questions. In this case, question selector 122 selects questions from only the specified categories. For example, the teaching platform 100 may have multiple modes (such as, but not limited to a normal mode, a practice mode, a tour mode, and/or the like), and in the practice mode (e.g., status=practice), the user can specify one or more categories from which the individual user is presented questions. In some embodiments, if knowledge analyzer 116 determines that the individual user is struggling with a particular category (or multiple particular categories), the individual user is presented an option to enter practice mode to practice questions from the particular category (or multiple particular categories) without affecting the user's learning path. In this case, the status is switched to practice, and question selector 122 selects questions from only the particular category (or multiple particular categories).

In some embodiments, in tour mode, some or all of the categories are linked by the learning path generator 118 in order of difficulty for a particular grade or level (for example, a grade or level identified by the individual user), and question selector 122 selects one or more questions from each of the linked categories. In this case, the individual user is presented the questions from each of the linked categories in order of difficulty, and one or more answers to each question may be input and received from the individual user. Knowledge analyzer 116 analyzes each of the answer inputs to determine if the individual user has sufficient knowledge or skills (e.g., based on the quantifiable outcome (X, Y)) for the indicated grade or level. If knowledge analyzer 116 determines that the individual user does not have sufficient knowledge or skills (e.g., based on the quantifiable outcome (X, Y) being below a first threshold value) for the indicated grade or level, the individual user is presented questions from each category of a lower grade or level, and the process is repeated until knowledge analyzer 116 determines a sufficient grade or level for the individual user. On the other hand, if knowledge analyzer 116 determines that the individual user exceeds the knowledge or skills (e.g., based on the quantifiable outcome (X, Y) exceeding a second threshold value) for the indicated grade level, the individual user is presented questions from each category of a higher grade or level, and the process is repeated until knowledge analyzer 116 determines a sufficient grade or level for the individual user. Similarly, if knowledge analyzer 116 determines that the individual user has sufficient knowledge or skills (e.g., based on the quantifiable outcome (X, Y) being between the first and second threshold values) for the indicated grade or level, knowledge analyzer 116 determines that the indicated grade or level is a or the sufficient grade or level for the individual user. In some embodiments, after the sufficient grade or level is identified for the individual user, tour mode is turned off and normal mode is turned on, for example, automatically. Accordingly, if additional areas, subject matter, or categories are subsequently added, the individual user may be automatically assessed (or assessed and placed at class or level) for those categories in tour mode without requiring additional programming.

Referring to FIG. 1, the reward calculator 124 provides incentives to the individual user to enhance engagement with the educational content. For example, in some embodiments, the incentives include points, tokens, tickets, trophies, level-ups, achievements, and/or the like, that are earned by advancing through the categories. In this case, the points, tokens, trophies, level-ups, achievements, and/or the like can be stored (e.g., in storage 126 or other suitable storage device), and can be exchanged or otherwise used to unlock additional content, for example, such as avatars, quests, stickers, collectable cards, characters, additional time, additional content (e.g., games, movies, videos, etc.), and/or the like. For example, in some embodiments, reward calculator 124 calculates a reward type and a reward value for each answer. The reward type and the reward value are calculated and awarded to the user, based on the individual user's progress (e.g., opening new categories, mastering older categories, and the like) and/or the accuracy of the answers (e.g., based on the quantifiable outcome (X, Y)).

In some embodiments, the reward type and the reward value for various categories, modes, statuses, and/or the like, are different. In some embodiments, the reward type and reward value for each of the categories, modes, statuses, and/or the like is determined by one or more layer types. For example, in some embodiments, a RewardTypeID layer type associated with a particular category determines the reward type for answering (e.g., correctly answering) one or more questions from the particular category. In some embodiments, a CategoryRewardPoints layer type associated with a particular category determines the reward value (e.g., number of points) to issue for answering (e.g., correctly answering) one or more questions from the particular category. In some embodiments, a RefresherRewardPoints layer type associated with a particular category determines the reward value (e.g., number of points) to issue for answering (e.g., correctly answering) one or more questions from a refresher category. In some embodiments, a CategoryProgressStars layer type associated with a particular category determines the reward type for advancing to the particular category. However, the present disclosure is not limited thereto, and in other embodiments, any suitable layer types can be used to calculate the rewards.

In some embodiments, a user (e.g., administrator user) can create assignments or manual learning paths for the individual user to answer questions from categories that are manually assigned by the user. For example, the user is presented the list of categories and associated quantifiable outcome for each category on a GUI (or other suitable display), and can create assignments or manual learning path by selecting one or more categories on the GUI. In this case, the user can allocate rewards for completing the assignments. For example, in some embodiments, the user can review the report generated by teaching platform 100 to determine the categories or subject matters that the individual user is struggling with, and can select the categories and the number of questions from the categories to present to the individual user. In this case, the user can set daily goals or rewards and/or can set the rewards the individual user can receive for completing the assignments.

Figure 2:
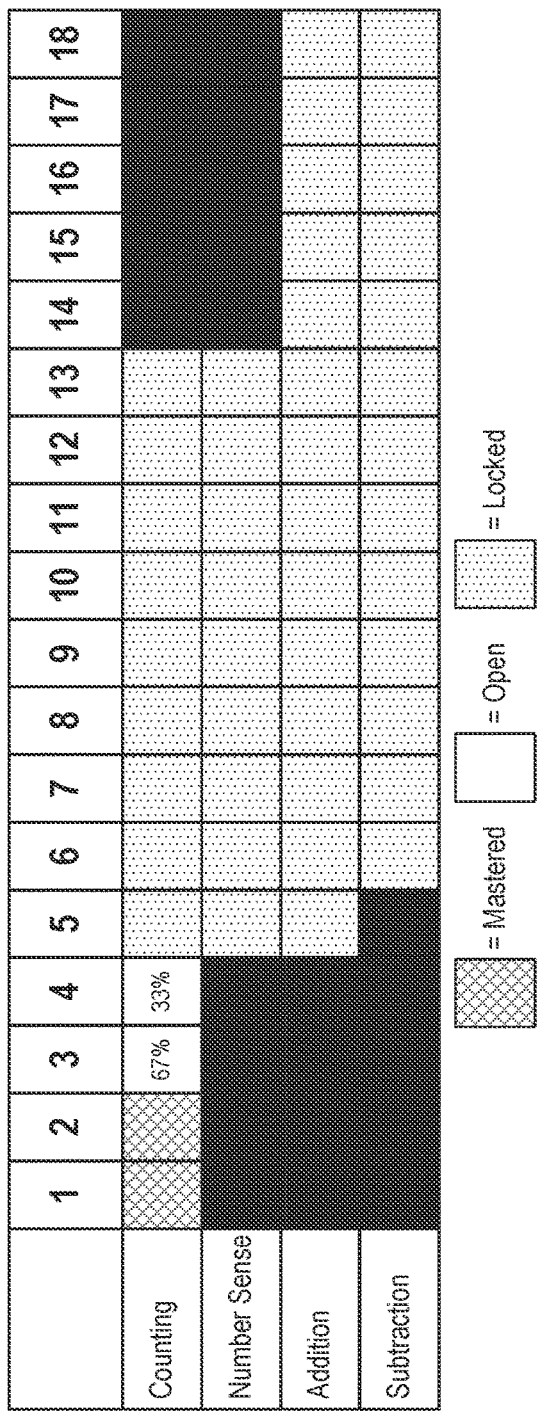
FIG. 2 is a graphical representation of a non-linear learning path with a slower pace, according to an exemplary embodiment.
Figure 3:
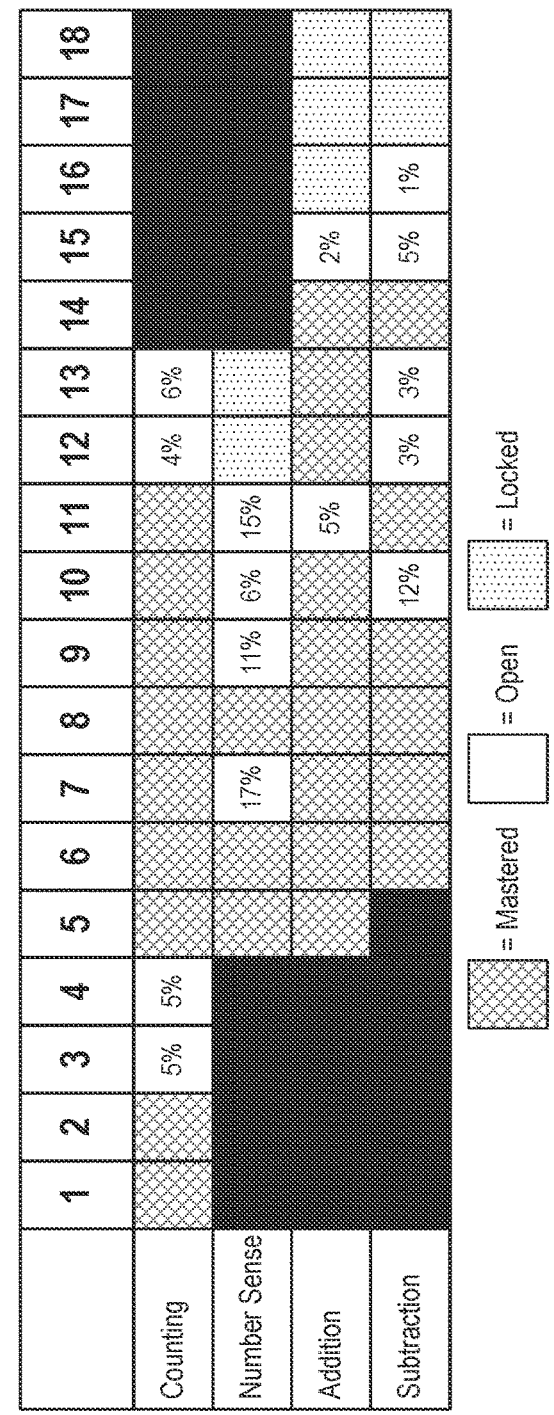
FIG. 3 is a graphical representation of a non-linear learning path with a normal pace, according to an exemplary embodiment.
Figure 4:
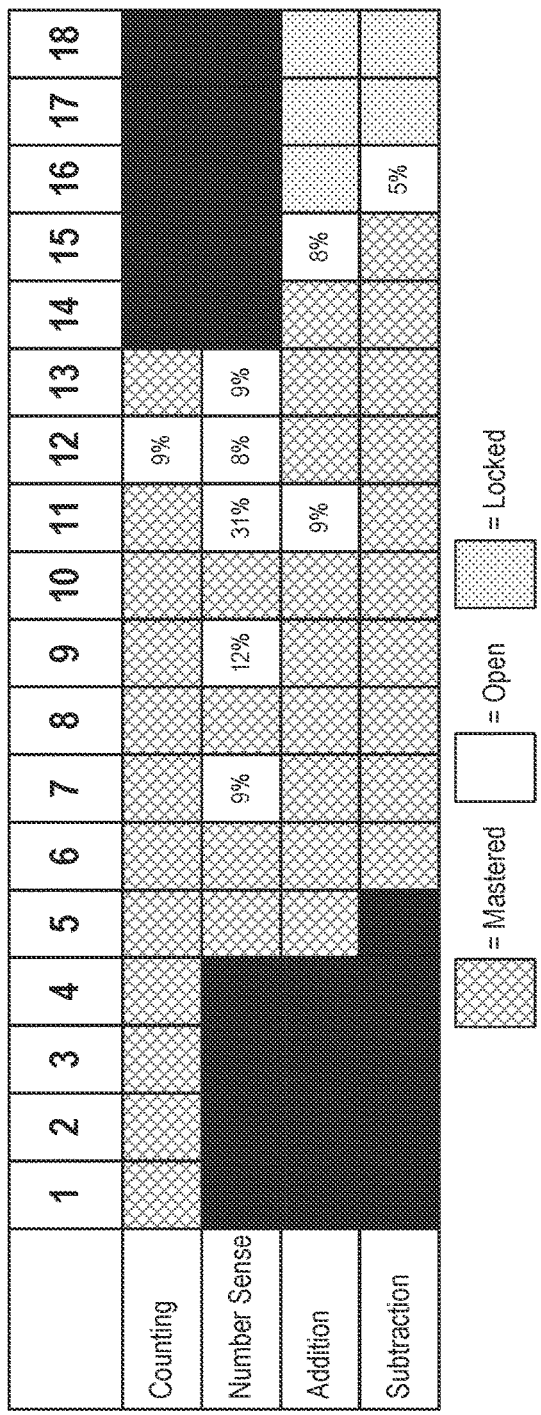
FIG. 4 is a graphical representation of a non-linear learning path with an accelerated pace, according to an exemplary embodiment.

Referring now to FIGS. 2-5, a graphical representation of a non-linear learning path for various paces is shown, according to an exemplary embodiment. For illustration purposes, FIG. 2 shows the non-linear learning path with a slower pace, FIG. 3 shows the non-linear learning path with a normal pace, FIG. 4 shows the non-linear learning path with an accelerated pace, and FIG. 5 shows the non-linear learning path with a custom pace (e.g., user defined pace). However, the present disclosure is not limited thereto, and any number of suitable paces can be automatically generated or adjusted (e.g., based on status) or can be user defined (e.g., by adjusting one or more parameters) as discussed above. In FIGS. 2-5, each of the boxes represent a category, where white boxes represent open categories, boxes with dotted patterns represent locked categories, and boxes with weaved line patterns represent mastered categories. In FIGS. 2-5, each of the rows represent a subject (e.g., counting, number sense, addition, and subtraction) and each column-row pair represents a category (e.g., a topic within the subject) having increasing difficulty from left to right (e.g., 1-18). In a non-limiting example, for the subject counting, a less difficult category (e.g., counting 1) may include questions relating to a picture of a number of items which the individual user can count and provide an answer, whereas a more difficult category (e.g., counting 13) may include questions that list subsequent numbers with one or more blanks between the numbers and the individual user fills in the blanks to provide the answer. In another non-limiting example, for the subject addition, a less difficult category (e.g., addition 5) may include questions relating to adding 2 single digit numbers, whereas a more difficult category (e.g., addition 18) may include questions that require the individual user to add 3 or more 3 digit or greater numbers. In FIGS. 2-5, the percentages within the open categories represent a probabilistic value (e.g., as calculated by the learning path generator 118) corresponding to the probability that a subsequent question will be selected from the open categories.

Referring to FIGS. 1 through 5, in various embodiments, teaching platform 100 presents questions from one or more open categories based on the pace for an individual user. For example, in some embodiments, the pace for the individual user is determined based on the status of the individual user. In some embodiments, the status of the individual user is calculated by the knowledge analyzer 116 based on the quantifiable outcome (X, Y) of one or more questions answered by the individual user. In other embodiments, the pace for the individual user can be user defined. For example, the user (e.g., the individual user or an administrator user) can define or otherwise adjust the pace by defining one or more parameters as discussed above. In various embodiments, the pace is used to determine when the individual user should be presented questions from new (or locked) categories, when the individual user should no longer be presented questions from old (or unlocked) categories, and when the individual user should be presented questions from easier or more difficult categories.

For example, referring to FIG. 2, for the learning path having a slower pace, the individual user is generally required to show a substantial or complete understanding (e.g., answers a more number of questions in a row or more questions correctly, the individual user's quantifiable outcome exceeds a higher threshold such as 90%, or the like) of a particular category before the category is considered to be mastered. In addition, new categories are opened (or unlocked) only after the individual user demonstrates a substantial understanding (e.g., answers a more number of questions in a row or more questions correctly, the individual user's quantifiable outcome exceeds a threshold such as 70%, or the like) of the easier categories (or pre-requisites). In addition, questions from easier categories are more likely to be presented than questions from more difficult categories (e.g., until the easier categories are mastered). For example, as shown in FIG. 2, the learning path generator 118 calculates a probabilistic value of about 67% that a subsequent question will be selected from counting 3 and a probabilistic value of about 33% that a subsequent question will be selected from counting 4. In this case, there is about a 67% chance that question selector 122 will select a question from counting 3 and about a 33% chance that question selector 122 will select a question from counting 4.

Referring to FIG. 3, for the learning path having a normal pace, the individual user is generally required to show a good or moderate understanding (e.g., answers a number of questions in a row or more questions correctly, the individual user's quantifiable outcome exceeds a threshold such as 50%, or the like) of the easier categories (or pre-requisites) before being presented questions from new categories. In addition, many categories can be opened without mastering the easier categories (or pre-requisites). Further, open categories can be mastered in any order since questions from more difficult categories are just as likely or more likely to be presented than question from easier categories. For example, as shown in FIG. 3, the learning path generator 118 calculates a probabilistic value of only about 5% for each of counting 3 and counting 4, while the other more difficult open categories account for about 90%. Accordingly, the normal pace puts less emphasis on mastering easier concepts before being presented more difficult concepts.

Referring to FIG. 4, for the learning path having a faster pace, new categories are opened (or unlocked) once the individual user demonstrates a basic understanding (e.g., answers a less number of questions in a row or less questions correctly, the individual user's quantifiable outcome exceeds a lower threshold such as 50%, or the like) of the easier categories (or pre-requisites). In addition, the individual user is generally required to only show reasonable aptitude (e.g., answers a less number of questions in a row or less questions correctly, the individual user's quantifiable outcome exceeds a low threshold such as 60%, or the like) in a particular category before the category is considered to be mastered. Further, questions from more difficult categories are more likely to be presented than question from easier categories. For example, as shown in FIG. 4, the learning path generator 118 calculates a probabilistic value of about 31% that a subsequent question will be selected from number sense 11, while the easier categories (e.g., number sense 7 and number sense 9) account for about 18% combined. Accordingly, the faster pace allows an individual user that excels in a particular subject or category to tackle more challenging and harder questions and concepts.

Referring to FIG. 5, for the learning path having a custom pace, the individual user is presented questions from categories as defined by a user (e.g., the individual user or an administrator user). The user can open as many categories (or as few categories) as desired, and can define parameters that the individual user is required to satisfy in order to master the category. Further, the user can define the number of questions that should be presented from each of the opened categories. In this case, the learning path generator 118 calculates a probabilistic value for each of the open categories based on the number of questions that should be presented from each of the opened categories. Accordingly, the custom pace allows the user to override the learning path determined by the learning path generator 118.

Figure 8:
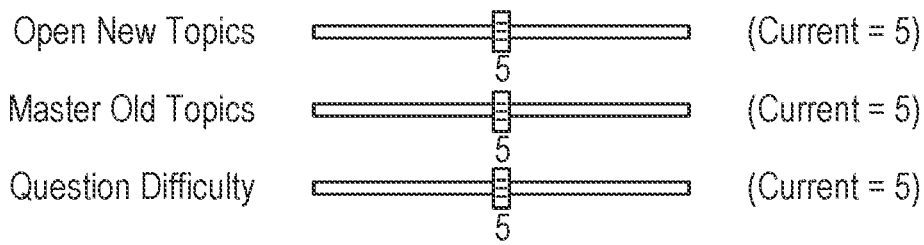
FIG. 8 shows a user interface to adjust parameters for generating a custom pace, according to one embodiment.

For example, in some embodiments, a user (e.g., individual user or administrator user) can adjust the pace based on one or more user defined parameters to define a custom pace as discussed above. In some embodiments, the user can adjust each of the parameters via the input device of the individual user device 102 or the administrator user device 104 (or other device connected to the network 106), through a slider, buttons, or other suitable selector displayed on a GUI (e.g., a scale of 1-10), or other suitable input mechanism. In a non-limiting example, referring to FIG. 8, which shows a user interface to generate the custom pace, according to one embodiment, the user can adjust three parameters from a scale of 1-10 using a series of sliders. The first parameter can correspond to how fast new categories are opened to the individual user, the second parameter can correspond to how easily topics should be considered to be mastered, and the third parameter can correspond to question difficulty for the questions that should be selected (e.g., by question selector). In the example of FIG. 8, the user can set any of the parameters between 1-10 to generate the custom pace, with an easy pace corresponding to each of the parameters being set to 1, a normal pace corresponding to each of the parameters being set to 5, and a hard pace corresponding to each of the parameters being set to 10. Thus, in this example, the user has the ability to generate the custom pace having 1000 possible combinations from these three parameters alone. However, the present disclosure is not limited thereto, and it should be appreciated that any of the layer types can be adjusted on any suitable scale to produce more or fewer combinations of the custom pace.

Figure 6:
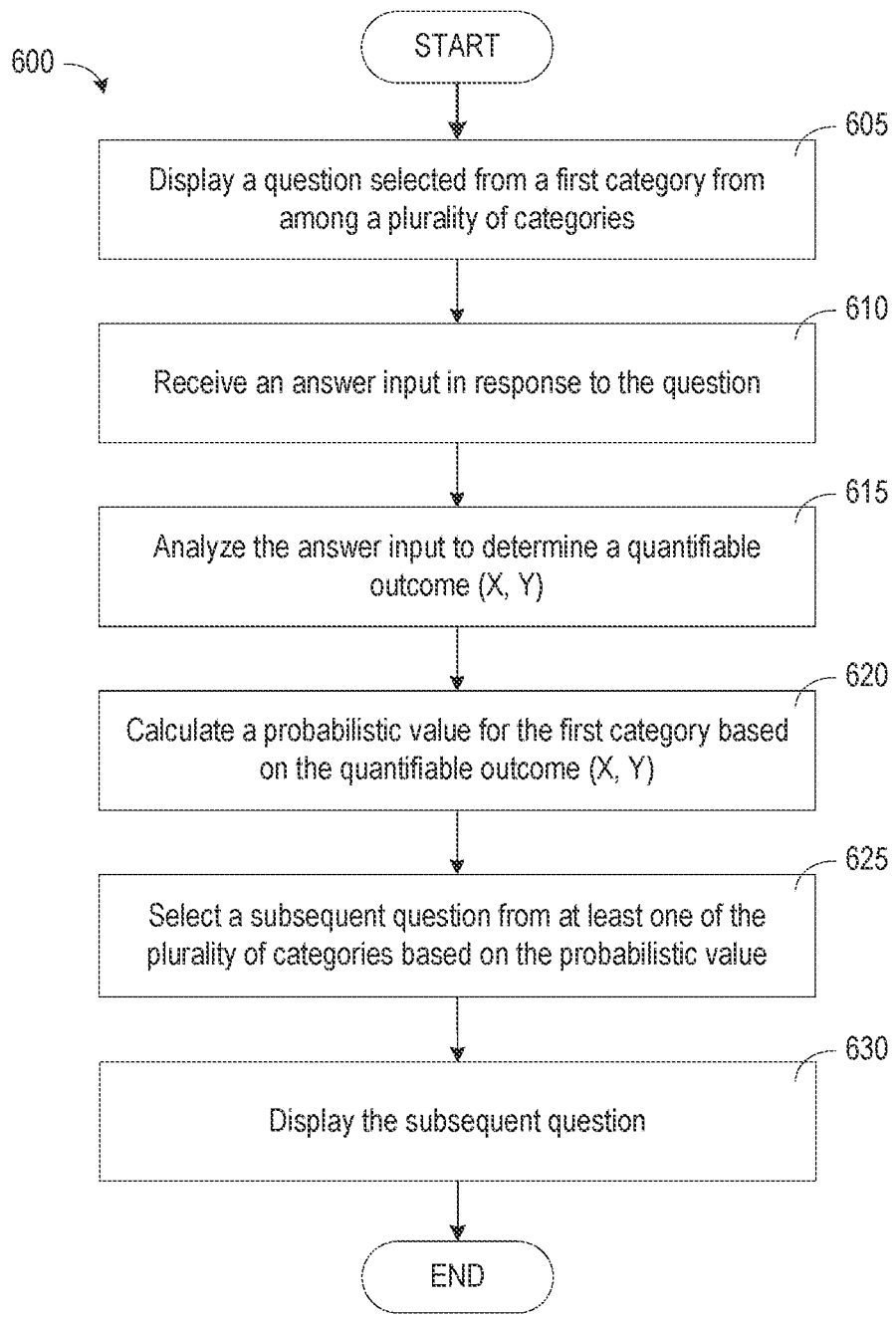
FIG. 6 is a block diagram of a process or method of selecting educational content to present to an individual user, according to an exemplary embodiment.

Referring now to FIG. 6, a block diagram of a process or method of selecting educational content to present to an individual user is shown, according to an example embodiment. In some embodiments, the process 600 starts, and one or more questions are displayed from a first category from among a plurality of categories at block 605. In some embodiments, each question is displayed on a display device associated with a user device of an individual user. An answer input is received in response to each question at block 610. In some embodiments, the answers are input via an input device associated with the user device. In some embodiments, each answer input is selected from a plurality of possible answer inputs displayed to the user. In some embodiments, each answer input is manually input by the individual user (e.g., typed, spoken, written, and/or the like).

In some embodiments, the answer input is analyzed to determine a quantifiable outcome (X, Y) at block 615. For example, in some embodiments, the knowledge analyzer 116 calculates the quantifiable outcome (X, Y) based on the answer input. In some embodiments, the quantifiable outcome (X, Y) includes a number of questions asked X and accuracy of the answers received Y. In some embodiments, each answer input may have a correct answer and one or more incorrect answers. In some embodiments, each answer input may have a partially correct answer and a partially incorrect answer. For example, in some embodiments, each answer input may be scored between 0 and 1, with 0 being a completely incorrect answer, 1 being a completely correct answer, and partial credit being between 0 and 1 for any partially correct/incorrect answers. In some embodiments, the partial credit scores may be used to calculate the Y value.

In some embodiments, knowledge analyzer calculates a status of the individual user based on the quantifiable outcome (X, Y). In some embodiments, the status of the individual user can include one of struggling, excelling, practice, normal, and/or the like. In some embodiments, a pace is determined based on the status of the individual user. For example, in some embodiments, learning path generator 118 adjusts the pace based on the status of the individual user. In some embodiments, learning path generator adjusts the pace based on one or more user defined parameters. For example, in some embodiments, learning path generator adjusts the pace based on a first user defined parameter for controlling when new categories are selected (or unlocked), a second user defined parameter for controlling when categories are considered to be mastered, a third user defined parameter for controlling when questions are selected from harder (or easier) categories, and/or the like.

In some embodiments, a probabilistic value is calculated for the first category based on the quantifiable outcome (X, Y) at block 620, and a subsequent question is selected from at least one of the plurality of categories based on the probabilistic value at block 625. For example, in some embodiments, learning path generator 118 calculates a probability that a subsequent question will be selected for presentation from a particular category. In some embodiments, the probabilistic value includes category weights of one or more categories. For example, in some embodiments, learning path generator 118 calculates a first category weight for the first category and a second category weight for a second category. In this case, question selector 122 selects the subsequent question from one of the first and second categories based on the first and second weights. In some embodiments, learning path generator adjust a pre-requisite flag (e.g., layer type=2) for the first category based on the quantifiable outcome (X, Y). In this case, if the pre-requisites for the first category is satisfied, learning path generator 118 unlocks a third category that is linked to the first category as a pre-requisite to the third category. In some embodiments, learning path generator 118 calculate a third category weight for the third category based on the quantifiable outcome, and question selector 122 selects the subsequent question from one of the first, second, and third categories based on the first, second, and third weights. Accordingly, the subsequent question is displayed at block 630, and the process ends.

While the foregoing has been described with reference to a teaching platform, the present disclosure is not limited thereto, and aspects and features of the present disclosure can be applied to any suitable platform that presents content to individual users, such as video games or other interactive games, social media, fitness trackers and other health care content providers, and/or the like. For example in the context of a video game, a category can correspond to a challenge or event with a rating (e.g., 1-10) depending on how the individual user reacts to the challenges or events, and the quantifiable outcome (X, Y) can be calculated where X is the number of challenges presented or the number of attempts for a particular challenge or event and Y is a rating or close proximity to a desired goal. In a non-limiting example, the challenge can correspond to defeating a boss or level in a video game with X corresponding to the number of attempts and Y corresponding to a remaining health or number of combination moves for each attempt X at defeating the boss or level. In another non-limiting example, the challenge can correspond to shooting a target with X corresponding to the number of shots and Y corresponding to how close the shot X is to the bulls eye. In another example, in the context of social media, a category can correspond to the type of post or subject matter of the post, and the quantifiable outcome (X, Y) can be calculated where X is the number of posts viewed and Y is the percentage of likes, hearts, smiley faces, or the like given for the posts. In another example, in the context of a fitness tracker, the category can correspond to health measurements (e.g., steps challenge), and the quantifiable outcome (X, Y) can be calculated where X can correspond to the number of days since the user started the fitness program (e.g., walking) and Y can correspond to a number of steps for each day X or an average variance of the measurements (e.g., number of steps) from day X to day 1. Accordingly, the present disclosure can be applied to any platform that measures a quantifiable outcome (X, Y) of an individual user's interaction with any suitable type of content.

Sample Use Cases

Hereinafter, some sample use cases of the teaching platform, according to various exemplary embodiments, will be described as non-limiting examples. However, it should be understood that the present disclosure is not limited thereto. For example, in various other embodiments, aspects and features of the present disclosure can be applied to any suitable platform that presents content to individual users, such as video games or other interactive games, social media, fitness trackers and other health care content providers, and/or the like.

In some embodiments, the teaching platform presents dynamically engaging content to an individual user. For example, in some embodiments, teaching platform implements various gamification elements into the educational content to keep individual users interested in learning. In some embodiments, the individual user's interaction with these elements is all controlled by one or more layer types. In some embodiments, these elements include, for example, tickets that can be exchanged for packs of cards to build a Card Collection, tickets that can be exchanged on clothing or other accessories to modify their avatar, earning achievements, competing in leaderboards, and/or the like. However, the present disclosure is not limited thereto. In some embodiments, teaching platform presents a daily Rewards Progress bar on the GUI with a daily Rewards Goal that the individual user can strive to achieve.

For example, in some embodiments, the dynamically engaging content begins with a series of games that are driven by questions (e.g., Question Games). In these Question Games, the individual user answers questions to engage in gameplay. In addition to earning rewards for answering questions, the individual user can also earn additional rewards for gameplay. For example, in some embodiments, the individual user earns Tickets by answering questions, but by advancing through the gameplay (e.g., racing a Black Knight), the individual user earns Tokens when they complete the game or level (e.g., defeat the Black Knight). For example, in the game of racing a Black Knight, the individual user's knight moves by answering questions correctly. In some embodiments, these games are developed independently of the questions. Accordingly, any individual user at any place in their respective learning path can play the same game, and the difficulty of the game from a question standpoint will be presented based on their knowledge or skills (of their respective learning path). Accordingly, in some embodiments, teaching platform is configured to implement any game to transform the game into a Question Game.

In some embodiments, teaching platform presents content to an individual user without requiring the individual user to answer questions (e.g., free play content). In this case, the individual user can earn rewards (e.g., tokens) that can be exchanged or otherwise used to unlock the free play content. For example, teaching platform offers a series of Token Games that do not have questions. Instead the individual user can spend the Tokens earned during the Question Games, and play free play games without having to answer questions. In some embodiments, individual users can earn Tickets by simply playing the free play games.

In some embodiments, teaching platform includes an administrator user portal to allow an administrator user (e.g., a parent, guardian, supervisor, manager, teacher, mentor, and/or the like) to customize the experience for the individual user. For example, in some embodiments, the administrator user portal includes various tabs or sections that present one or more reports to the administrator user with respect to the individual user. For example, in some embodiments, the tabs or sections include a Participate tab, an Encourage tab, an Assign tab, a Review tab, a Progress tab, a Performance tab, a Pace tab, and/or the like.

In some embodiments, the Participate tab presents the categories that the individual user needs the most help with. In this case, the administrator user can override the learning path to require the question selector to select as many questions as desired from the categories, which the administrator user can use to practice with the individual user. In some embodiments, the answers to the questions are hidden until the administrator user chooses to reveal them. In some embodiments, the administrator user can skip categories as well as re-visit categories, for example, depending on if the categories were skipped or reviewed (e.g., in terms of the number of days to wait before a category is re-presented). In some embodiments, after the administrator user finishes practicing a category with the individual user, the individual user is presented a number of questions from this category for self-practice. The number of questions can be set by the administrator user. In some embodiments, the administrator user can create or set their own categories to practice. For example, the administrator user can select categories while reviewing results where they feel practice is needed and then can engage the individual user for more practice in these categories.

In some embodiments, in the encourage tab, the administrator user can set a daily rewards goal for the individual user, and can send messages of encouragement to the individual user as they progress towards their daily goal. In some embodiments, in the assign tab, the administrator user can create Assignments of different types (Free Practice, Homework and Tests, and/or the like). In this case, the administrator user can name the assignment, choose the number of questions, choose any number of categories, set a Start and End Date, and/or the like In some embodiments, in the review tab, the results of each assignment are displayed to the administrator user. In some embodiments, the administrator user can click or otherwise select an Assignment to review the outcome of each question for this Assignment. In some embodiments, the administrator user can sort the assignments and/or questions answered by date, any number of recent questions, any number of recent incorrect questions, and/or the like.

In some embodiments, in the progress tab, the administrator user can view the individual user's progress in the learning path as one or more reports. In some embodiments, in the performance tab, the administrator user can view the individual user's performance by accuracy in the subjects and/or categories. In some embodiments, in the pace tab, the administrator user can set the pace by adjusting one or more attributes as discussed above. In some embodiments, the administrator user can set the pace by selecting a pre-set pace, for example, from among a slower pace, normal pace, faster pace, exploratory pace easy, exploratory pace normal, exploratory pace hard, and/or the like. In some embodiments, the exploratory paces allow the individual user to select the categories from which the individual user would like to explore.

In some embodiments, the administrator user portal allows the administrator user to receive reports for more than one individual user. For example, in some embodiments, the administrator user portal allows the administrator user to set groups or classes of individual users, and can control the experience for individual users in a group or class as a whole. In some embodiments, the administrator user can set the groups or classes of individual users based on the abilities of the individual users in the groups or classes. In some embodiments, the administrator user can pair individual users in the same group or pair individual users from different groups. For example, in some embodiments, teaching platform is configured to create groups based on ability. In this case, teaching platform determines the individual user with the lowest amount of progress (e.g., based on a ProgressStarLayer layer type), and adds or associates any individual user paired with this individual user. Then, for each of these individual users, teaching platform defines a function $f(T, X, Y)$, where T is the category (or topic) and $(X, Y)$ is the quantifiable outcome for each of the individual users. For each individual user in the group, teaching platform calculates a distance in a L3 X R space between the function $f(T, X, Y)$ for each added individual user and the function $f(T, X, Y)$ for the original individual user, where L3 is a 3-dimensional lattice (which may be finite) and R is a real number line (0 to 5 stars). In some embodiments, this process is repeated until a desired number of individual users are added to the group, and then the process is repeated until all groups are created.

In some embodiments, the administrator user can create challenges for the individual users in a particular group (or across groups). For example, in some embodiments, the administrator user can create challenges, which can be for a defined time period, a Ticket Goal, a defined group of individual users to participate in the challenge, and a reward or rewards for placing in the top X places in the challenge. In some embodiments, the challenge is displayed or otherwise notified to the individual users selected to participate in the challenge, and the individual user is incentivize to earn as many rewards as possible (and thus, to learn as much as possible).

In some embodiments, teaching platform may include various other elements and functions, for example, such as membership levels. In some embodiments, teaching platform may restrict access to users (e.g., individual users or administrator users) dynamically using these levels. For example, in some embodiments, teaching platform may be a subscription based service that restricts access to paying members. In some embodiments, teaching platform may have various access levels, such as, for example, Guest, Member, VIP, and the like, with different access privileges for different access levels.

In various embodiments, teaching platform is designed to leverage Big Data techniques. In other words, in various embodiments, teaching platform requires little hard coded programming, and is dynamic and flexible. In this case, each of the features described above may be modified in various different ways as needed or desired. For example, additional categories can be added as desired, various learning paths and paces may be generated, additional skill levels can be created, additional gamification elements can be added, and the like. For example, if teaching platform has thousands of users, teaching platform can apply K-Means Clustering to identify different patterns of both learning and engagement. In this case, for each cluster teaching platform applies Test and Control methods to determine which settings derive the best (or optimal) educational outcomes and the best (or optimal) engagement levels. In some embodiments, teaching platform can generate predictive models so that new users may be given the best initial settings possible based on their demographic and early interaction behaviors. As teaching platform gains more information about a user, teaching platform identifies their cluster more accurately, and can modify the settings for the individual user to the best known (or optimal settings) for that cluster.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual user elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The foregoing description of illustrative embodiments has been presented for purposes of illustration and of description. It is not intended to be exhaustive or limiting, and modifications and variations may be possible in light of the above teachings or may be acquired from practice of the disclosed embodiments. Various modifications and changes that come within the meaning and range of equivalency of the claims are intended to be within the scope of the invention. Thus, while certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

What is claimed is:

1. A system comprising:
an internet engagement platform comprising:
a display device;
a network;
one or more processors; and
memory coupled to the one or more processors having instructions stored thereon that, when executed by the one or more processors, cause the one or more processors to:
apply a model to a plurality of inputs obtained from a plurality of users to generate one or more clusters identifying patterns of learning and engagement, wherein the one or more clusters indicate settings that result in optimal engagement levels;
display over the network, a question on the display device, the question corresponding to a first category from among a plurality of categories, at least one of the plurality of categories being locked;
receive over the network, an input from a user in response to the question from an input device associated with the display device;
analyze the input from the user in response to the question to determine a quantifiable outcome based on the input;
calculate a probabilistic value for the first category based on the quantifiable outcome;
receive over the network, information on the user's interaction with the engaging content;
determine the changes in the user's mood or the user's behavior based on the information on the user's interaction with the engaging content;
calculate a status of the user based on the quantifiable outcome of at least one question and the determined changes in the user's mood or the user's behavior, the status representative of the user's engagement;
provide initial settings, the initial settings based on the input from the user and the information on the user's interaction with the engaging content being inputted to the model and an output of the model corresponding to a first cluster of the plurality of clusters, the first cluster indicating the initial settings for the user;
determine a pace for presenting questions for the user from the plurality of categories based on the status, wherein determine a pace includes using the initial settings indicated by the first cluster;
unlock locked categories from among the plurality of categories based on the user's pace;
select a subsequent question based on the user's engagement;
display over the network, the subsequent question tailored to the user's engagement on the display device;
receive, over the network, a second input from the user in response to the subsequent question from the input device associated with the display device;
modify the initial settings for the user based on the second input, the input from the user, and information on the user's interaction with the engaging content corresponding to a second cluster of the plurality of clusters, the second cluster different from the first cluster; and
adjust the model based on the second input from the user, wherein adjust the model includes adjusting the settings indicated by the one or more clusters.

2. The system of claim 1, wherein the quantifiable outcome includes a number of questions asked and accuracy of answers received.

3. The system of claim 1, wherein the probabilistic value corresponds to a category weight of the first category.

4. The system of claim 3, wherein the instructions further cause the one or more processors to:
calculate a first category weight for the first category based on the quantifiable outcome;
calculate a second category weight for a second category from among the plurality of categories based on the quantifiable outcome; and
select the subsequent question from among the first and second categories based on the first and second category weights.

5. The system of claim 4, wherein the instructions further cause the one or more processors to:
adjust a pre-requisite flag for the first category based on the quantifiable outcome;
unlock a third category linked to the first category based on the pre-requisite flag for the first category;
calculate a third category weight for the third category based on the quantifiable outcome; and
select the subsequent question from among the first, second, and third categories based on the first, second, and third category weights.

6. The system of claim 1, wherein each of the plurality of categories is mastered, unlocked, or locked based on the pace and the quantifiable outcome.

7. The system of claim 1, wherein the instructions further cause the one or more processors to:
receive a first parameter value for controlling when the new categories are unlocked; and
adjust the pace based on the first parameter value.

8. The system of claim 7, wherein the instructions further cause the one or more processors to:
receive a second parameter value for controlling when categories are mastered; and
adjust the pace based on the second parameter value.

9. The system of claim 8, wherein the instructions further cause the one or more processors to:
receive a third parameter value for controlling when questions are selected from harder categories; and
adjust the pace based on the third parameter value.

10. A method of engaging over the internet content tailored to an individual user's engagement comprising:
applying a model to a plurality of inputs obtained from a plurality of users to generate one or more clusters identifying patterns of learning and engagement, wherein the one or more clusters indicate settings that result in optimal engagement levels;
displaying over a network, by one or more processors, a question on a display device coupled to the one or more processors, the question corresponding to a first category from among a plurality of categories, at least one of the plurality of categories being locked, the questions comprising engaging content;
receiving over the network, by the one or more processors, an input from a user in response to the question from an input device coupled to the display device;
analyzing, by the one or more processors, the input to determine a quantifiable outcome based on the input from the user in response to the question;

calculating, by the one or more processors, a probabilistic value for the first category based on the quantifiable outcome;

receiving over the network, by the one or more processors, information on the user's interaction with the engaging content;

determining, by the one or more processors, the changes in the user's mood or the user's behavior based on the information on the user's interaction with the engaging content;

calculating, by the one or more processors, a status of the user based on the quantifiable outcome of at least one question and the determined changes in the user's mood or the user's behavior, the status representative of the user's engagement;

providing initial settings, the initial settings based on the input from the user and the information on the user's interaction with the engaging content being inputted to the model and an output of the model corresponding to a first cluster of the plurality of clusters, the first cluster indicating the initial settings for the user;

determining, by the one or more processors, a pace for presenting questions for the user from the plurality of categories based on the status, wherein determining a pace includes using the initial settings indicated by the first cluster;

unlocking, by the one or more processors, locked categories from among a plurality of categories based on the user's pace;

selecting, by the one or more processors, a subsequent question based on the user's engagement;

displaying over the network, by the one or more processors, the subsequent question tailored to the user's engagement on the display device;

receive, over the network, a second input from the user in response to the subsequent question from the input device associated with the display device;

modifying the initial settings for the user based on the second input, the input from the user, and information on the user's interaction with the engaging content corresponding to a second cluster of the plurality of clusters, the second cluster different from the first cluster; and adjusting the model based on the second input from the user, wherein adjusting the model includes adjusting the settings indicated by the one or more clusters.

11. The method of claim 10, wherein the quantifiable outcome includes a number of questions asked and accuracy of answers received.

12. The method of claim 10, wherein the probabilistic value corresponds to a category weight of the first category.

13. The method of claim 12, further comprising:
calculating, by the one or more processors, a first category weight for the first category based on the quantifiable outcome;

calculating, by the one or more processors, a second category weight for a second category from among the plurality of categories based on the quantifiable outcome; and selecting, by the one or more processors, the subsequent question from among the first and second categories based on the first and second category weights.

14. The method of claim 13, further comprising:
adjusting, by the one or more processors, a pre-requisite flag for the first category based on the quantifiable outcome;

unlocking, by the one or more processors, a third category linked to the first category based on the pre-requisite flag for the first category;

calculating, by the one or more processors, a third category weight for the third category based on the quantifiable outcome; and selecting, by the one or more processors, the subsequent question from among the first, second, and third categories based on the first, second, and third category weights.

15. The method of claim 10, wherein each of the plurality of categories is mastered, unlocked, or locked based on the pace and the quantifiable outcome.

16. The method of claim 10, further comprising:
receiving, by the one or more processors, a first parameter value for controlling when the new categories are unlocked; and adjusting, by the one or more processors, the pace based on the first parameter value.

17. The method of claim 16, further comprising:
receiving, by the one or more processors, a second parameter value for controlling when categories are mastered; and adjusting, by the one or more processors, the pace based on the second parameter value.

18. The method of claim 17, further comprising:
receiving, by the one or more processors, a third parameter value for controlling when questions are selected from harder categories; and adjusting, by the one or more processors, the pace based on the third parameter value.

* * * * *